(12) United States Patent
Lee et al.

(10) Patent No.: US 9,730,145 B2
(45) Date of Patent: Aug. 8, 2017

(54) IN-TRANSIT DETECTION USING LOW COMPLEXITY ALGORITHM FUSION AND PHONE STATE HEURISTICS

(71) Applicant: QUALCOMM Incorporated, San Diego, CA (US)

(72) Inventors: Jin Won Lee, San Diego, CA (US); Shankar Sadasivam, San Diego, CA (US); Disha Ahuja, San Jose, CA (US); Carlos M. Puig, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 652 days.

(21) Appl. No.: 13/839,483

(22) Filed: Mar. 15, 2013

(65) Prior Publication Data

US 2014/0269363 A1    Sep. 18, 2014

(51) Int. Cl.
*H04W 24/08* (2009.01)
*H04W 48/04* (2009.01)
(Continued)

(52) U.S. Cl.
CPC ............ *H04W 48/04* (2013.01); *G01S 5/0205* (2013.01); *H04W 4/025* (2013.01); *H04W 4/206* (2013.01);
(Continued)

(58) Field of Classification Search
CPC ....... H04W 8/22; H04W 4/025; H04W 4/206; H04W 24/08; H04W 64/006; H04W 24/00; H04W 4/00; H04B 7/00; H04B 17/00
(Continued)

(56) References Cited

U.S. PATENT DOCUMENTS

| 7,881,902 B1 | 2/2011 | Kahn et al. |
| 8,965,398 B2 * | 2/2015 | Zhu ............................... 370/338 |

(Continued)

FOREIGN PATENT DOCUMENTS

WO    WO-2013001134 A1    1/2013

OTHER PUBLICATIONS

Chon J., et al., "LifeMap: A Smartphone-Based Context Provider for Location-Based Services", IEEE Pervasive Computing, IEEE Service Center, Los Alamitos, CA. US, vol. 10, No. 2, Apr. 2011, pp. 58-67.

(Continued)

*Primary Examiner* — Jae Y Lee
*Assistant Examiner* — Jean F Voltaire
(74) *Attorney, Agent, or Firm* — Muncy, Geissler, Olds & Lowe, P.C.

(57) ABSTRACT

System and methods are disclosed to use information available on the state of mobile devices in a heuristics-based approach to improve motion state detection. In one or more embodiments, information on the WiFi connectivity of mobile devices may be used to improve the detection of the in-transit state. The WiFi connectivity information may be used with sensor signal such as accelerometer signals in a motion classifier to reduce the false positives of the in-transit state. In one or more embodiments, information that a mobile device is connected to a WiFi access point (AP) may be used as heuristics to reduce the probability of falsely classifying the mobile device in the in-transit state when mobile device is actually in the hand of a relatively stationary user. Information on the battery charging state or the wireless connectivity of the mobile devices may also be used to improve the detection of in-transit state.

83 Claims, 6 Drawing Sheets

(51) Int. Cl.
*H04W 64/00* (2009.01)
*H04W 4/02* (2009.01)
*H04W 4/20* (2009.01)
*G01S 5/02* (2010.01)
*G01C 22/00* (2006.01)

(52) U.S. Cl.
CPC ........ *H04W 64/006* (2013.01); *G01C 22/006* (2013.01); *Y02B 60/50* (2013.01)

(58) Field of Classification Search
USPC ........................................................ 370/252
See application file for complete search history.

(56) References Cited

U.S. PATENT DOCUMENTS

| | | | | |
|---|---|---|---|---|
| 2007/0049195 | A1* | 3/2007 | Chun | H04B 7/18519 455/3.02 |
| 2011/0190008 | A1 | 8/2011 | Eronen et al. | |
| 2011/0300875 | A1 | 12/2011 | Kim et al. | |
| 2012/0309411 | A1* | 12/2012 | MacGougan | H04W 64/006 455/456.1 |
| 2012/0309412 | A1 | 12/2012 | MacGougan et al. | |
| 2012/0310587 | A1 | 12/2012 | Tu et al. | |
| 2013/0155876 | A1* | 6/2013 | Potra | H04W 36/14 370/248 |
| 2014/0192722 | A1 | 7/2014 | Krause et al. | |
| 2015/0078327 | A1 | 3/2015 | Medbo et al. | |

OTHER PUBLICATIONS

International Search Report and Written Opinion—PCT/US2014/023085—ISA/EPO—Oct. 28, 2014.
Wang Y., et al., "A Framework of Energy Efficient Mobile Sensing for Automatic User State Recognition", Proceedings of the 7th International Conference on Mobile Systems, Applications, and Services, Mobisys 109, Jun. 22, 2009 (Jun. 22, 2009),-Jun. 25, 2009 (Jun. 25, 2009), pp. 179-192.

* cited by examiner

IN-TRANSIT DETECTION USING LOW COMPLEXITY ALGORITHM FUSION AND PHONE STATE HEURISTICS

TECHNICAL FIELD

This application generally relates to mobile devices. In particular, this application relates to methods and systems for determining motion states of mobile devices.

BACKGROUND

Many services and applications depend on the detection and classification of motion states of a mobile device and by extension, the motion states of users of the mobile device. For example, a navigation application on a smartphone may switch from pedestrian navigation to vehicular navigation when the smartphone detects a transition of motion states from walking to driving; an application may warn a user to "stop texting while driving" when the smartphone detects that the user is moving at a vehicle speed when texting. Other services relying on a determination of motion states of users through mobile devices include geo-fencing, place-of-reference services, services to improve WiFi connectivity, etc. For these contextual-awareness services and applications, the motion states of interest may include stationary, fidgeting, walking, running, driving, and others.

Conventionally, accelerometers are used in smartphones to produce acceleration signals that are processed by motion classifiers to detect one of the motion states. Accelerometers offer the advantage of low power consumption when compared to other sensors like gyroscopes, an important consideration for mobile devices with their limited battery power. For this reason, most smartphones today are equipped with accelerometers.

While motion states such as stationary, fidget, walk, and run produce acceleration signals that have unique signatures and thus may be processed to detect the correct motion state, detecting the drive state has proven to be more challenging. This is because accelerometer signals produced when smartphones are moving at vehicle speed may be similar to the accelerometer signals produced when the smartphones are moving at pedestrian speed, or when the smartphones are in a pocket, or held in the hand of a stationary user. Due to the similarities in the signatures of the acceleration signals, motion classifiers may misidentify a user as driving when the user is walking or stationary, or falsely identify the user as stationary though the user is driving. These misidentifications are undesirable as they adversely affect applications whose performance relies on the correct identification of the motion states. For example, a high rate of false positives of the drive state when a user is walking may mean unnecessary GPS fixes, resulting in a quicker battery drain. A high rate of false positives of the drive state may also produce erroneous warnings to a user to "stop texting while driving" when the user is actually stationary. While GPS may be leveraged to resolve the motion state ambiguities, enabling GPS causes significant drain on the battery. Furthermore, GPS signals are not always available. Other remedies such as adding additional sensors increase cost and raise power consumption of mobile devices. As such, there is a need for a low power solution to improve the detection of drive state in mobile devices.

SUMMARY

System and methods are disclosed to use information available on the state of mobile devices where the information may be obtained with no impact on power consumption in a heuristics-based approach to improve motion state detection. In one or more embodiments, information on the WiFi connectivity of mobile devices may be used to improve the detection of the in-transit state. In-transit state may also be referred to as the drive state and is used to refer to any vehicular motion, regardless of whether a user of the mobile device is driving a vehicle or just a passenger in a vehicle. The WiFi connectivity information may be used with sensor signal such as accelerometer signals in a motion classifier to reduce the false positives of the in-transit state. In one or more embodiments, information that a mobile device is connected to a WiFi access point (AP) may be used as heuristics to reduce the probability of falsely classifying the mobile device as in the in-transit state when mobile device is actually in the hand of a relatively stationary user.

Systems and methods are also disclosed to combine algorithms tuned to detect particular states with an accelerometer-based motion state classifier to improve motion state detection of activities associated with mobile devices. Modules operating on accelerometer signals may be tuned to detect states such as the walk state or the stationary state. The modules tuned to the walk or the stationary state set a stronger prior probability for the tuned states. The output from these modules may be used by the motion state classifier in a distributed or a hierarchical architecture to determine the final motion state. The distributed or hierarchical processing of the accelerometer signals by the tuned modules and the motion state classifier reduces the probability of misidentification of motion states when the mobile devices are actually in the tuned states. For example, it may reduce false positives of detecting the in-transit state when the mobile devices are actually in the walk or stationary state.

System and methods are also disclosed to use other information available on the state of mobile devices a heuristics-based approach to improve motion state detection. In one or more embodiments, information on the battery charging state or information on the wireless connectivity of the mobile devices may be used to improve the detection of in-transit state. Heuristics such as detecting that a mobile device is being charged while in motion may indicate that the mobile device is plugged into a car charger. The motion state classifier may use the heuristics to improve the detection of an in-transit state when signatures of the accelerometer signals may not sufficiently distinguish between the in-transit state and when the mobile device is moving at pedestrian speed, or when the mobile device is in a pocket, or held in the hand of a stationary user. The heuristics-based approach may be used by the motion classifier in a distributed or hierarchical architecture to better differentiate the in-transit state and the stationary or the walk state.

A method for determining a motion state associated with a device is disclosed. The method includes receiving information on the WiFi connectivity of the device. The method also includes processing the information on the WiFi connectivity of the device to set a probability that the device is in a certain motion state. The method also includes receiving one or more sensor signals from one or more sensor devices. The sensor signals have characteristics such as signal signatures that reflect the motion of the device. The method further includes processing by a motion classifier the sensor signals aided by the probability that the device is in a certain motion state to generate a final motion state for the device.

A method for determining a motion state associated with a device is disclosed. The method includes receiving one or more sensor signals from one or more sensor devices. The sensor signals have characteristics such as signal signatures that reflect the motion of the device. The method also includes processing the sensor signals by at least one tuned modules to generate one or more tuned signals. Each of the tuned modules is configured to detect a tuned state of the device and to generate one tuned signal that indicates a probability of the corresponding tuned state. The method further includes processing the sensor signals by a motion classifier to generate a most likely motion state from the characteristics of the sensor signals. The method further includes combining the tuned signals from the tuned modules and the most likely motion state from the motion classifier to determine a final motion state of the device.

An apparatus to determine a motion state of the apparatus is disclosed. The apparatus includes a sensor to register the motion of the apparatus, a module to generate information on the WiFi connectivity of the apparatus, a memory, and processors coupled to the memory. The sensor registers the motion of the apparatus in sensor signals that have signal characteristics that reflect the motion of the apparatus. The processors process the information on the WiFi connectivity of the apparatus to set a probability that the apparatus is in a certain motion state. The processors also process the sensor signals aided by the probability that the apparatus is in a certain motion state to generate a final motion state for the apparatus.

An apparatus to determine a motion state of the apparatus is disclosed. The apparatus includes a sensor to register motion of the apparatus, a memory, and processors coupled to the memory. The sensor registers the motion of the apparatus in sensor signals that have signal characteristics that reflect the motion of the apparatus. The processors process the sensor signals to detect one or more tuned states of the apparatus and to generate one or more tuned signals. Each of the tuned signals indicates a probability of the corresponding tuned state. The processors also process the sensor signals to generate a most likely motion state from the characteristics of the sensor signals. The processors further combine the tuned signals and the most likely motion state to determine a final motion state of the apparatus.

A non-transitory machine-readable medium used to store machine-readable instructions is disclosed. The instructions, when executed by one or more processors, perform a method for determining a motion state associated with a device. The method includes receiving information on the WiFi connectivity of the device. The method also includes processing the information on the WiFi connectivity of the device to set a probability that the device is in a certain motion state. The method also includes receiving one or more sensor signals from one or more sensor devices. The sensor signals have signal characteristics that reflect the motion of the device. The method further includes processing the sensor signals aided by the probability that the device is in a certain motion state to generate a final motion state for the device.

A non-transitory machine-readable medium used to store machine-readable instructions is disclosed. The instructions, when executed by one or more processors, perform a method for determining a motion state associated with a device. The method includes receiving one or more sensor signals. The sensor signals have signal characteristics that reflect the motion of the device. The method also includes processing the sensor signals to detect one or more tuned states of the device and to generate tuned signals. Each of the tuned signals indicates a probability of the corresponding tuned state. The method further includes processing the sensor signals to generate a most likely motion state from the characteristics of the sensor signals. The method further includes combining the tuned signals and the most likely motion state to determine a final motion state of the device.

A system for determining a motion state associated with the system is disclosed. The system includes means for generating information on the WiFi connectivity of the system. The system also includes means for processing the information on the WiFi connectivity of the system to set a probability that the system is in a certain motion state. The system also includes means for registering a motion of the system in sensor signals. The sensor signals have signal characteristics that reflect the motion of the system. The system further includes means for processing the sensor signals aided by the probability that system device is in a certain motion state to generate a final motion state for the system.

A system for determining a motion state associated with the system is disclosed. The system includes means for registering a motion of the system in sensor signals. The sensor signals have signal characteristics that reflect the motion of the system. The system also includes means for processing the sensor signals to detect one or more tuned states of the system and means to generate tuned signals. Each of the tuned signals indicates a probability of the corresponding tuned state. The system further includes means for processing the sensor signals to generate a most likely motion state from the characteristics of the sensor signals. The system further includes means for combining the tuned signals and the most likely motion state to determine a final motion state of the system.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
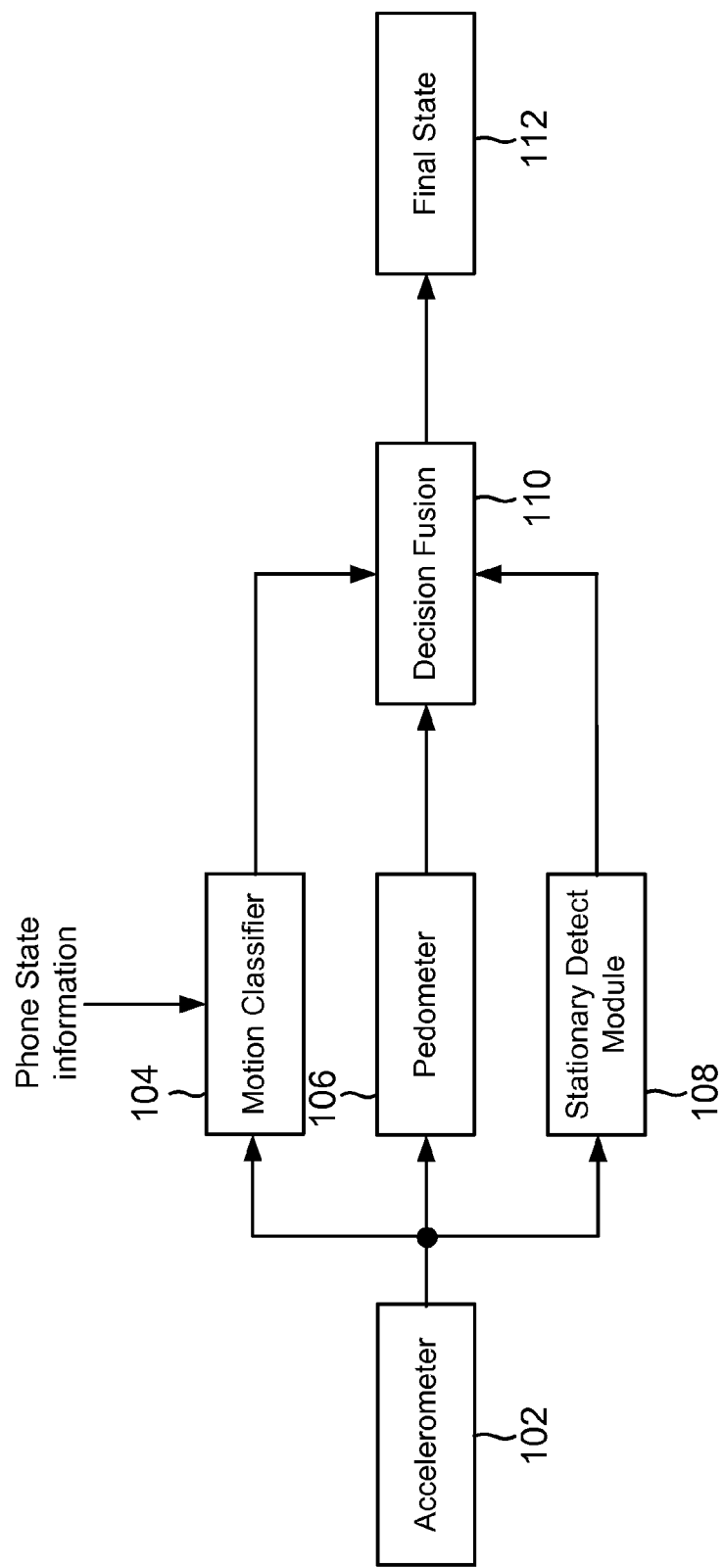
FIG. 1 shows a system for motion state classification that uses modules tuned to detect walk state and stationary state along with a motion classifier using accelerometer signals in a distributed architecture according to one embodiment of the subject matter of the present disclosure.

Systems and methods are disclosed for using WiFi connectivity information of a device as heuristics to mitigate the false positives of the in-transit state when the device is associated with a stationary, fidget, walk, or run state. The WiFi connectivity information may be used to determine whether or not the device is in an in-transit state with high confidence. Probability information on whether or not the device is in the in-transit state is used to influence a motion classifier in determining a final motion state using sensor signals such as accelerometer signals.

For example, when the WiFi connectivity information indicates that the device is connected to a non-mobile AP, there is a high probability that the device is not in the in-transit state. This probability information may be used by the motion classifier to drive the final motion state away from the in-transit state as an aid in resolving the motion states using the sensor signals. Advantageously, WiFi heuristics may be used to determine that the mobile device is in the hand of a relatively stationary user and to reduce the probability of misclassifying the device in the in-transit state. Situations where the mobile device is connected to a mobile AP, such as when the user is traveling in a bus with mobile WiFi, may be detected based on a rate of change of cell ID of the cellular network.

Even when the device is not connected to a WiFi network, the device may perform periodic WiFi scans of the APs in range. The results from the periodic WiFi scan may similarly be analyzed to determine whether or not the device is in an in-transit state with high confidence. For example, if information from the periodic WiFi scans indicate that there is a common non-mobile AP, there is a high probability that the device is not in the in-transit state. This probability information may be used by the motion classifier to drive the final motion state away from the in-transit state.

Systems and methods are disclosed for an accelerometer-based motion state classifier to process accelerometer signals in a distributed or a hierarchical architecture to improve motion state detection of activities associated with mobile devices. Embodiments of the present disclosure shifts motion state detection from a one-level approach in which a motion state classifier alone processes signals from sensors such as an accelerometer to a distributed or hierarchical architecture in which modules tuned to detect particular states assist the motion state classifier.

In one embodiment, a peak detection based pedometer module operating on accelerometer signals may be tuned to detect walking steps. If the pedometer module reports steps continuously, there is a higher confidence level for detecting a walk state. Similarly, a stationary detection module based on the standard deviation or noise statistics of the accelerometer signals may be tuned to differentiate the stationary state from states involving motion. These modules improve the motion state detection by assigning a higher degree of confidence to the tuned states. That is, the output from the pedometer module or the stationary detection module indicates a higher prior probability of the walk state or the stationary state, thus mitigating the false positives of the in-transit state.

In one embodiment, the results from the pedometer module and the stationary detection module may be fused with the results from the motions classifier to improve the detection of the in-transit state from the walk state or the stationary state in a distributed architecture. In one embodiment, the pedometer module and the stationary detection module may be used to gate the running of the motion classifier in a hierarchical architecture. For example, if the motion state from the pedometer module or the stationary detection module is determined with a high degree of confidence, or if the results from tuned modules indicate a strong prior probability of the tuned states, the motion classifier may be bypassed when determining the motion state.

As a further improvement to the detection of motion state, a heuristics-based approach in which information on the operating state of a mobile device may be combined with motion state detection based on sensors to better differentiate between the in-transit state and the stationary state. The information on the state of the mobile device may be obtained with no impact on power consumption. In one embodiment, if the mobile device indicates it's in a charging state, and the results of the motion state detection based on accelerometer signals preliminarily indicate a motion state, this may indicate to the motion state classifier that the mobile device is being charged in a moving vehicle. In one embodiment, if the mobile device is connected to a car Bluetooth device, and the results of the motion state detection based on accelerometer signals preliminarily indicate a motion state, this may indicate that the mobile device is in a moving vehicle.

Thus there may be a higher degree of confidence that the motion state is in the in-transit state than relying on the accelerometer-based motion state detection alone. Because an extended in-transit state is often confused with the stationary state, such as when the mobile device is in the pocket, or held in the hand of a stationary user, information on the charging state or the Bluetooth connectivity of the mobile device may be used as heuristics to mitigate the stationary state false positives when the mobile device is actually in an in-transit state. These heuristics-based solutions are not available all the time as they depend on usage patterns of the mobile device, and may not be used alone. However, when available, information on the state of the mobile device may be used to aid in the motion state detection with little or no additional processing requirement or battery drain.

FIG. 1 shows a system for motion state classification that uses modules tuned to detect walk state and stationary state along with a motion classifier using accelerometer signals in a distributed architecture according to one embodiment of the subject matter of the present disclosure. The motion state classification system may be implemented in a mobile device. The mobile device may be a smart phone (e.g., iPhone, Google phone, or other phones running Android, Window Mobile, or other operating systems), a tablet computer (e.g., iPad, Galaxy), personal digital assistant (PDA), a notebook computer, or various other types of wireless or wired computing devices. The mobile device may communicate over a wireless network such as cellular, wide area network (WAN), WiFi hot spot, WiMax, personal area network (PAN), Bluetooth, and/or other appropriate types of communication networks.

The mobile device has an accelerometer 102 that registers acceleration signals from the motion of the mobile device. Accelerometer 102 provides acceleration signals to a motion classifier 104, a pedometer module 106, and a stationary detect module 108. The motion state classification system of FIG. 1 is a distributed architecture because instead of having motion classifier 104 alone process the accelerometer signals, pedometer module 106 and stationary detect module 108 also process the accelerometer signals to detect particular states for assisting motion state classifier 104.

Pedometer module 106 may be a peak detection based pedometer module that is tuned to detect steps during walking. Pedometer module 106 may be implemented to focus on signatures of the accelerometer signals fundamental to walking. If pedometer module 106 reports steps continuously, there is a higher confidence level for detecting a walk state. The higher confidence level may be expressed as a higher prior probability of the walk state, which may be used to bias the motion state classification system away from selecting the in-transit state as the final state. Thus, the higher prior probability of the walk state may be used to reduce in-transit false positives. Pedometer module 106 may also have the added performance benefit of a lower latency of detecting steps compared to a generalized motion classification module.

Stationary detect module 108 may be tuned to detect a relative lack of motion based on the standard deviation or noise statistics of the accelerometer signals. For example, stationary detect module 108 may be tuned to differentiate absolute rest from motion. Stationary detect module 108 may output a simple no motion/motion indication to set a higher prior probability of the stationary state, which again may be used to bias the motion state classification system away from selecting the in-transit state as the final state. Thus, the higher prior probability of the stationary state may be used to reduce in-transit false positives when the user is in a stationary state, or is fidgeting while standing or sitting.

Motion classifier 104 operates on the accelerometer signals to generate the most likely motion state given the signatures of the accelerometer signals. Motion classifier 104 is not tuned to any specific states, but instead classifies the accelerometer signals as belonging to one of the states for stationary, fidget, walk, run, in-transit, etc. Motion classifier 104 finds the most likely motion state by finding the motion state that has the highest conditional probability based on the signatures of the accelerometer signals. The conditional probability for the different motion states may be derived by using results from a training phase in which the mobile device is put into one of the motion states to generate signatures of the accelerometer signals for that state. Motion classifier 104 may output the conditional probability for the most likely motion state.

In addition to using accelerometer signals to find the state that has the highest conditional probability, motion classifier 104 also uses phone state information as heuristics to drive the decision. In one embodiment, heuristics based on the state of WiFi connectivity of the mobile device may be used to aid in motion state detection, as will be explained in FIG. 2A. Just as pedometer module 106 or stationary detect module 108 may indicate a higher prior probability that the mobile device is in a walk state or a stationary state, detection of WiFi connectivity may indicates a higher prior probability that the mobile device is not in an in-transit state. Motion classifier 104 may leverage this information to mitigate in-transit false positives when the mobile device is in the stationary, fidget, or walk state.

In one embodiment, information on the operating state of a mobile device may be used as heuristics in combination with a motion indication to aid in in-transit state detection, as will be explained in FIG. 4. For example, when the mobile device is in a charging state or is connected to a car Bluetooth device while motion is detected, it may indicate a higher prior probability that the mobile device is in the in-transit state. Motion classifier 104 may leverage this information to mitigate misclassifying the in-transit state into the stationary, fidget, or walk state.

A decision fusion module 110 fuses the decisions from motion classifier 104, pedometer module 106, and stationary detect module 108 to generate a detect state. For example, decision fusion module 110 may use the higher prior probability of the walk state received from pedometer module 106 to drive the decision toward the walk state even if motion classifier 104 indicates an in-transit state. Similarly, decision fusion module 110 may use the higher prior probability of the stationary state received from stationary detect module 108 to drive the decision toward the stationary state. In one or more embodiments, phone state information may be used as heuristics by decision fusion module 110 to drive the decision. The decision from decision fusion module 110 may be processed by a final state module 112 to generate a final decision from the motion state classification system.

Figure 2A:
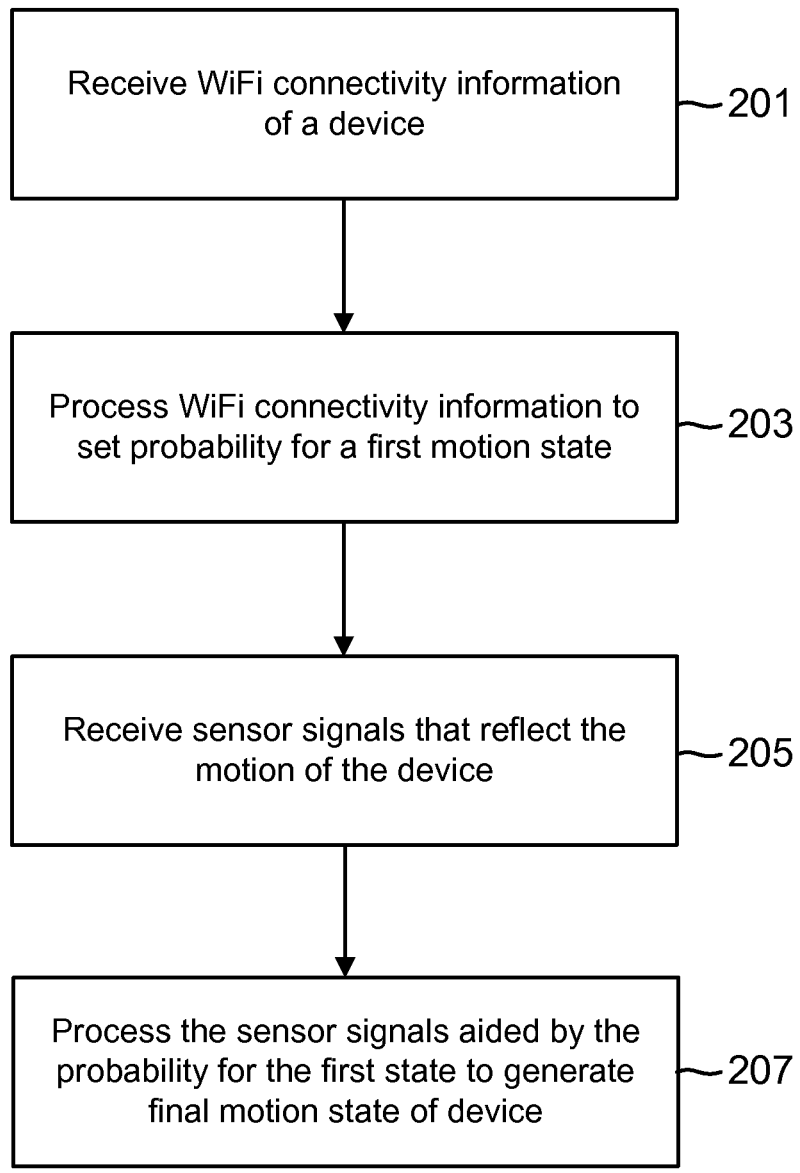
FIG. 2A shows a flowchart of a process for using WiFi information as heuristics to influence the determination of a motion state by a motion classifier according to one or more embodiments of the subject matter of the present disclosure.

FIG. 2A shows a flowchart of a process for using WiFi information as heuristics to influence the determination of a motion state by a motion classifier according to one or more embodiments of the subject matter of the present disclosure. Information on the WiFi connectivity of mobile devices may be easily obtained and may be used to aid motion state detection with little or no additional processing requirement or power drain. In addition, with the increasing penetration of free WiFi based technologies, WiFi based heuristics may be readily available to mitigate or eliminate in-transit false positives when users are in a stationary state, such as standing, sitting, etc., or when the mobile device is placed on a desk.

In block 201, a motion classifier or a module external to the motion classifier receives information on the WiFi connectivity of a mobile device. The WiFi connectivity information may be obtained from an application program interface (API) of the mobile operating system (OS) or from other software interfaces. In block 203, the motion classifier or the module external to the motion classifier processes the WiFi connectivity information to set the probability for a first motion state. For example, information indicating that the mobile device is connected to a non-mobile AP may be used to set a high probability that the mobile device is not in the in-transit state. Conversely, information indicating that the mobile device is connected to a mobile AP may be used to set a high probability that the mobile device is in the in-transit state. Details on the processing of the WiFi connectivity information in block 203 will be provided in FIG. 2B.

In block 205, the motion classifier receives sensor signals from one or more sensors that register the motion of the mobile device. In one or more embodiments, the sensor signals may be an accelerometer signal registered by accelerometer 102. The sensor signals have signal characteristics that reflect the motion of the mobile device. For example, the accelerometer signal may have signatures that are characteristics of the motion state of the mobile device. In block 207, the motion classifier processes the sensor signals aided by the probability information for the first motion state derived from the WiFi connectivity information to generate a final motion state for the device. The motion classifier may determine the final motion state by finding the motion state that has the highest conditional probability based on the signatures of the accelerometer signals and the probability for the first motion state. The probability for the first motion state may bias the conditional probabilities for the various motion states.

In one or more embodiments, the motion classifier may bias the final motion state away from the first motion state if the first motion state has a low probability. In one or more embodiments, the motion classifier may bias the final motion state toward the first motion state if the first motion state has a high probability. For example, if the WiFi connectivity information sets a high probability that the motion device is not in the in-transit state, the motion classifier may decrease the conditional probability for the in-transit state and increase the conditional probability for the stationary state to bias the final motion away from the in-transit state and toward the stationary state. Conversely, if the WiFi connectivity information sets a high probability that the motion state is in the in-transit state, the motion classifier may increase the conditional probability for the in-transit state and decrease the conditional probability for non-in-transit states to bias the final state toward the in-transit state.

The process of FIG. 2A may be practiced entirely in a stand-alone motion classifier to determine a final motion state. In one or more embodiments, a module external to the motion classifier may process the WiFi connectivity information to set the probability for the first motion state. The external module may provide the probability information for the first motion state to the motion classifier. In one or more embodiments, motion classifier 104 or decision fusion 110 of the distributed architecture of FIG. 1 may use the WiFi based heuristics as an aid for motion state determination.

Figure 2B:
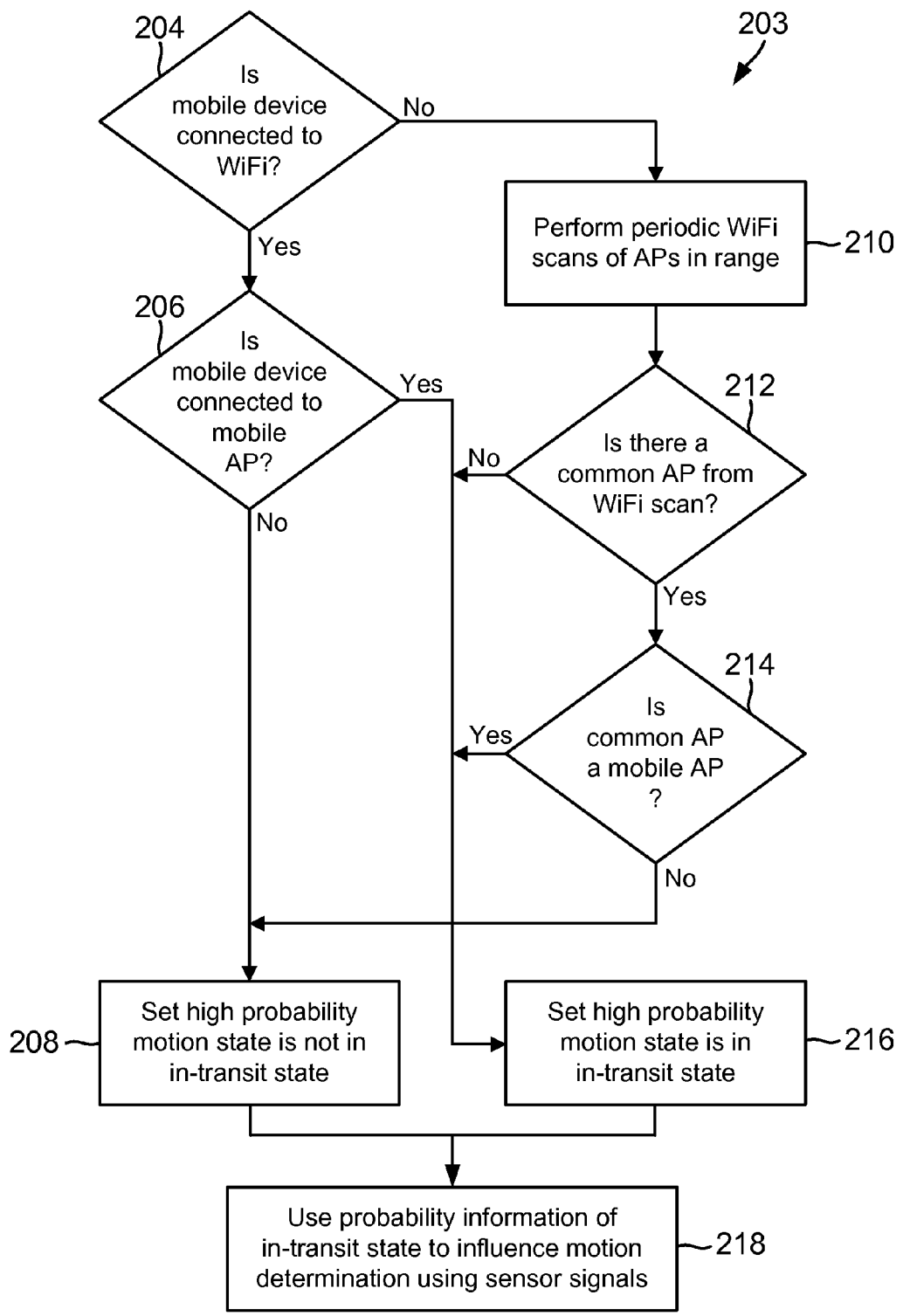
FIG. 2B shows a flowchart of a process for using WiFi based heuristics to reduce in-transit false positives in the process of FIG. 2A according to one embodiment of the subject matter of the present disclosure.

FIG. 2B shows a flowchart of a process for using WiFi based heuristics to reduce in-transit false positives in the process of FIG. 2A according to one embodiment of the subject matter of the present disclosure. In block 204, a motion classifier or a module external to the motion classifier determines if the mobile device is connected to a WiFi AP. If the mobile device is connected to a WiFi AP, there is a higher prior probability that the mobile device is not in an in-transit state. However, there may be situations where the mobile device is connected to a mobile AP, such as when the user is traveling in a bus with mobile WiFi's.

In block 206, the module determines if the mobile device is connected to a mobile AP. Mobile APs may be detected based on a rate of change of cellular ID information of the APs. Once a mobile AP is detected, it may be cached by the mobile device for future reference. If the mobile device is not connected to a mobile AP, the mobile device is most likely connected to a stationary AP. Thus, the mobile device is most likely not in the in-transit state. In block 208, the module sets a strong prior probability that the mobile device is not in the in-transit state if the connected AP is not a mobile AP. In one or more embodiments, the probability may be set to a conditional probability that the motion state is not in the in-transit state given that the mobile device is connected to a non-mobile AP based on historical data. In one or more embodiments, the probability that the mobile device is in the in-transit state may be set to 0 if the mobile device is connected to a non-mobile AP.

On the other hand, if the module detects that the mobile device is connected to a mobile AP, the mobile device is most likely in the in-transit state. In block 216, the module sets a strong prior probability that the mobile is in the in-transit state. In one or more embodiments, the probability may be set to a conditional probability that the motion state is in the in-transit state given that the mobile device is connected to a mobile AP based on historical data. In one or more embodiments, the probability that the mobile device is in the in-transit state may be set to 1 if the mobile device is connected to a mobile AP. In block 218, once the probability for the in-transit state or the non-in-transit state is set, the motion classifier uses the probability information to influence the determination of the final motion state using sensor signals. Thus, the WiFi connectivity information of the mobile device is used as heuristics to aid the motion classifier as discussed in block 207 of FIG. 2A. In one or more embodiments, the probability information for the in-transit or the non-in-transit state may be used to bias the conditional probabilities for all the possible motion states. In one or more embodiments, if the probability for the non-in-transit state is high enough, the motion classifier may eliminate the in-transit state from further consideration in the determination of the final motion state. In one or more embodiments, if the probability for the in-transit state is high enough, the motion classifier may be bypassed, and the final motion state is the in-transit state.

Even if the module determines that the mobile device is not connected to a WiFi AP in block 204, the mobile device may obtain information on any WiFi networks in range. In block 210, the mobile device performs periodic WiFi scans in the background to determine APs in range. The period for the WiFi scans may be set by the mobile OS and may be in the range of 15-30 sec. Heuristics based on the results of the background WiFi scans may be used as an aid in motion state detection. The module may use information from these background scans to better differentiate in-transit state from non-in-transit states. For example, because AP coverage is generally about 100 meters or less, if a smartphone detects the presence of common APs in WiFi scans with a period of 15 seconds, there is a high probability that the user is not in the in-transit state, if the driving speed threshold is set at 15 mph. If the scan period is greater than 15 seconds, the driving speed threshold may be set even lower, thus increasing the probability that the user is not in the in-transit state when there is the presence of common APs.

In block 212, the module determines if there are common APs found from consecutive scans. If there is no common AP, there is a high probability that the mobile device is in the in-transit state. In block 216, the module sets a strong prior probability that the mobile is in the in-transit state. If, on the other hand, there is a common AP, there is a high probability that the mobile device is not in the in-transit state. To detect the situation where the user may be traveling in the presence of mobile WiFi's, the module further determines if the common AP is a mobile AP in block 214. If the common AP is a mobile AP, there is also a high probability that the mobile device is in the in-transit state. In block 216, the module sets a strong prior probability that the mobile is in the in-transit state. Otherwise if the common AP is not a mobile AP, there is a high probability that the mobile device is not in the in-transit state. In block 208, the module sets a strong prior probability that the mobile device is not in the in-transit state. In one or more embodiments, if the probability that the mobile device is not in the in-transit state is very high, the motion classifier may eliminate the in-transit state from further consideration, and may proceed to determine the final motion state from the stationary, fidget, walk, or run state, etc. In one or more embodiments, the motion classifier may use the probability information for the in-transit or the non-in-transit state to bias the conditional probabilities for all the possible motion states.

Figure 3:
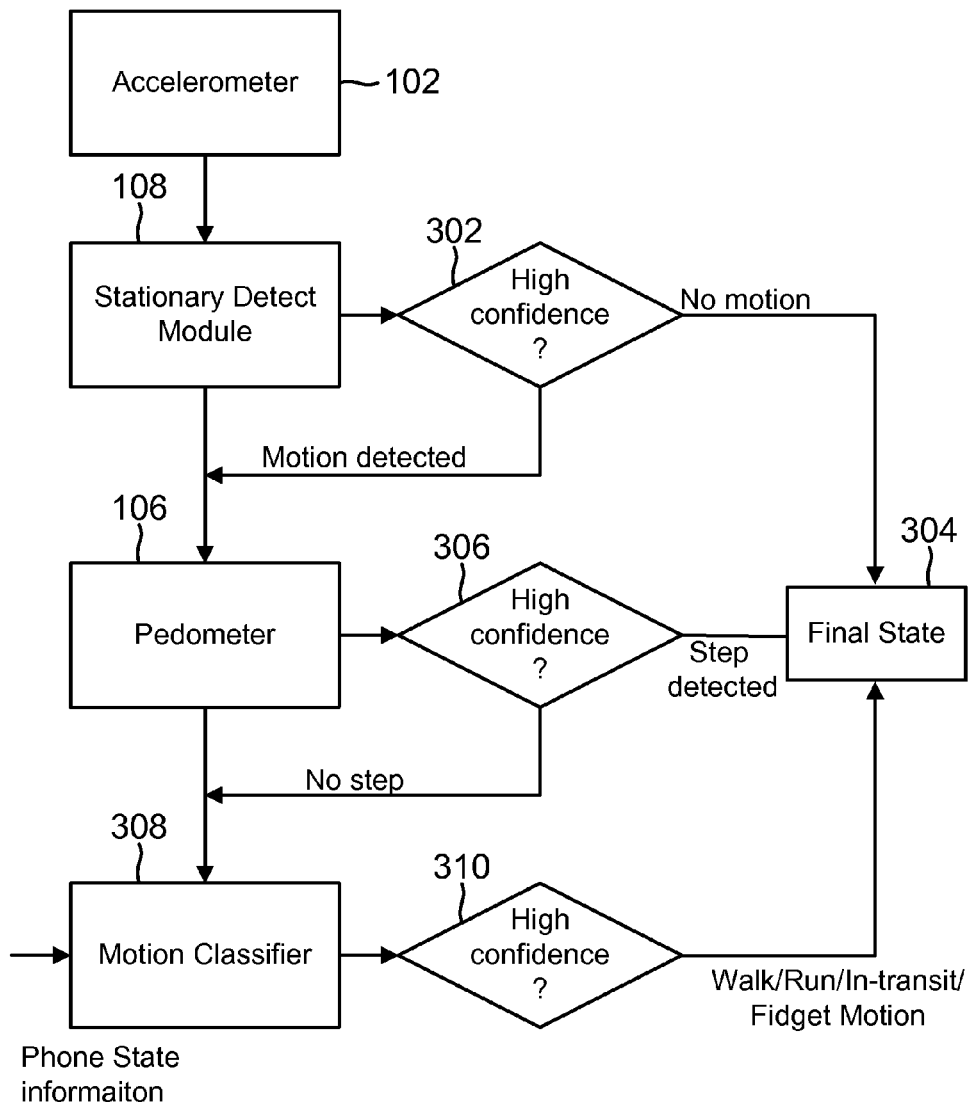
FIG. 3 shows a system for motion state classification that uses modules tuned to detect walk state and stationary state to gate a motion classifier in a hierarchical architecture according to one embodiment of the subject matter of the present disclosure.

FIG. 3 shows a system for motion state classification that uses modules tuned to detect walk state and stationary state to gate a motion classifier in a hierarchical architecture according to one embodiment of the subject matter of the present disclosure. The hierarchical architecture of FIG. 3 differs from the distributed architecture of FIG. 1 in that if there is a high degree of confidence in the tuned states generated from the tuned modules, the motion classifier may be bypassed when determining the final state. Thus, a hierarchy of modules operating on sensors input such as the accelerometer signals may be used to determine the motion state as a function of the robustness of the results from the tuned modules. This hierarchical architecture may reduce the complexity of the motion classifier with little degradation in performance. There may also be the added benefit of reduced latency.

Accelerometer 102, stationary detect module 108, and pedometer 106 may be the same as those found in FIG. 1. A motion classifier 308 may be a different version of the motion classifier (motion classifier 104) of FIG. 1. Stationary detect module 108 may be tuned to detect rest and may output a simple motion/no-motion indication. In decision block 302, a determination is made on the confidence level of the motion/no motion indication. For example, the system may determine if the prior probability of the stationary state as determined by stationary detect module 108 exceeds a threshold. If there is a high confidence level in the no-motion indication, motion classifier 308 may be bypassed all together. In one embodiment, a final state 304 may determine from the high confidence level of the no-motion indication that the detected state is the stationary state. On the other hand, if there is not a high confidence level in the no-motion indication, pedometer module 106 may operate on the accelerometer signals to detect the walk state or the run state from the other states associated with motion.

In decision block 306, a determination is made on the confidence level of the steps reported from pedometer 106. For example, the system may determine if the confidence level of the steps expressed as a prior probability of a walk state or of a run state exceeds a threshold. If there is a high confidence level in the steps, motion classifier 308 may again be bypassed. In one embodiment, final state 304 may determine from the high confidence level of the steps that the detected state is the walk state or the run state. On the other hand, if there is not a high confidence level in the steps, motion classifier 308 may operate on the signatures of the accelerometer signals to generate the most likely motion state. Motion classifier 308 may also use the motion indication from stationary detect module 108 and/or the steps reported from pedometer 106 as aid.

In addition, motion classifier 308 may also use phone state information as heuristics to drive the decision. In one embodiment, information on the charging state when there is motion indication from stationary detect module 108 may suggest that the mobile device is being charged in a moving vehicle. In one embodiment, information on Bluetooth connectivity of the mobile device to a car Bluetooth device when there is motion indication may suggest that the mobile device is in a moving vehicle. Motion classifier 308 may use the information to increase the conditional probability that the mobile device is in the in-transit state and to reduce the probability of misclassifying the in-transit state into the stationary, fidget, or walk state. In one embodiment, WiFi based heuristics may be used to reduce in-transit false positives as in FIG. 2A. In one or more embodiments, the phone state information may be used by motion classifier 308 to change the probability for the tuned states from the tuned modules. For example, if the WiFi based heuristics indicate that the mobile device is connected to a non-mobile AP, the motion classifier may increase the probability of the stationary state from stationary detect module 108 and/or the probability of the walk state or the run state from pedometer 106.

In decision block 310, a determination is made on the confidence level of the motion state from motion classifier 308. The confidence level may be the conditional probabilities for all the possible motion states from motion classifier 308. Motion classifier 308 may generate the confidence level for the motion states based on the confidence level for the tuned states from the tuned modules, the phone state information, and the sensor signals. A high confidence level in the motion state such as the walk, run, in-transit, or fidget state is used by final state module 304 to generate the detected state from the motion state classification system.

Figure 4:
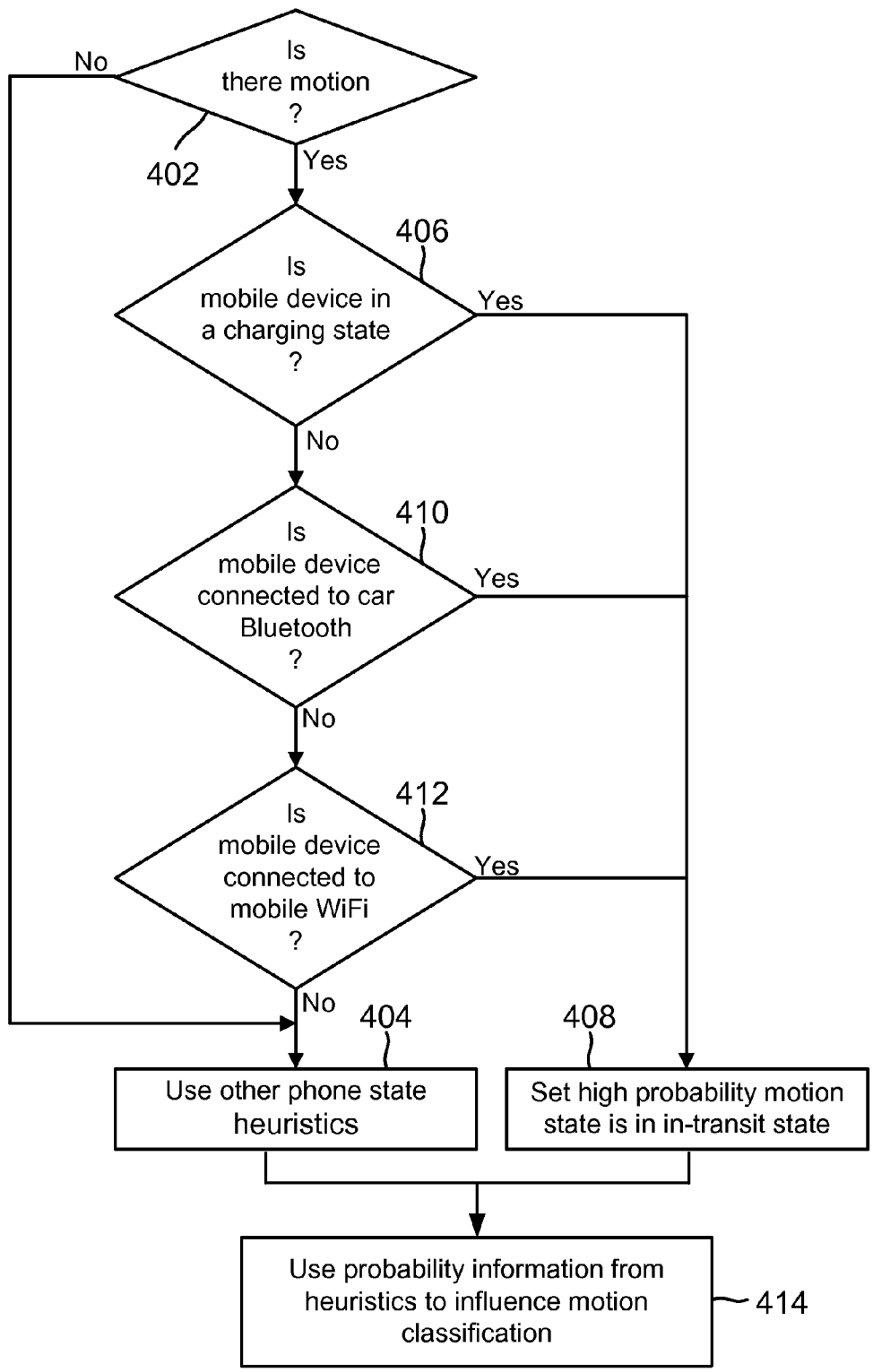
FIG. 4 shows a flowchart of a process for using phone state heuristics to improve the detection of in-transit state in the motion state classification system of FIG. 3 according to one embodiment of the subject matter of the present disclosure.

FIG. 4 shows a flowchart of a process for using phone state heuristics to improve the detection of in-transit state in the motion state classification system of FIG. 3 according to one embodiment of the subject matter of the present disclosure. Phone state heuristics may be used in combination with an indication of motion to aid to improve the detection of in-transit state. The advantage is that phone state information may be easily obtained and may be used to aid motion state detection with little or no additional processing requirement or power drain.

In block 402, motion classifier 308 receives the motion/no-motion indication from stationary detect module 108. Motion classifier 308 determines if there is an indication of a motion state. If there is no indication of motion, motion classifier 308 may use other phone state heuristics in block 404, such as the WiFi connectivity information for WiFi based heuristics. If there is an indication of motion, in block 406, motion classifier 308 determines if the mobile device is in a charging state. Information on the charging state of the mobile device may be obtained from API of the OS or from other software interface. If the mobile device is in a charging state, this may indicate that the mobile device is plugged into a car charger. There is a high probability that the user is charging the mobile device in a moving car. In block 408, motion classifier 308 sets a higher prior probability that the mobile device is in the in-transit state.

Because an extended in-transit state is often confused with the stationary state, such as when the mobile device is in the pocket, or held in the hand of a stationary user, information on the charging state of the smartphone may be used to mitigate the stationary state false positives. If the mobile device is plugged into a wall charger, a module tuned to detect an absolute stationary state may be used to distinguish car charging in the in-transit state from wall charging in the stationary state. Other heuristics-based approach such as using the WiFi connectivity information of the mobile device may also be used. In one embodiment, when the mobile device is in a charging state and a motion state is detected, a GPS receiver may be enabled to confirm the in-transit state. When either the mobile device is no longer in the charging state or the motion state is no longer detected, the GPS receiver may be enabled once again to confirm the end of the in-transit state.

If the mobile device is not in a charging state, in block 410, the mobile device determines if the mobile device is connected to a car Bluetooth device. The mobile device may be configured to recognize the Bluetooth environment in the car through a one-time setup. If the mobile device is connected to a car Bluetooth device, there is a high probability that the mobile device is in a moving vehicle. In block 408, motion classifier 308 sets a higher prior probability that the mobile device is in the in-transit state.

If the mobile device is no connected to a car Bluetooth device, in block 412, the mobile device determines if the mobile device is connected to a mobile WiFi. If the mobile device is connected to a mobile WiFi, such as when the user is connected to a mobile AP in a bus, there is also a high probability that the mobile device is in a moving vehicle. In block 408, motion classifier 308 sets a higher prior probability that the mobile device is in the in-transit state. Otherwise, if the mobile device is not connected to a car Bluetooth device, motion classifier 308 may use other phone state heuristics in block 404. In block 414, once the probability for the in-transit state or the probability information based on other heuristics is set, the motion classifier uses the probability information to influence the determination of the final motion state using sensor signals. Thus, phone state heuristics may be used to reduce the probability of misclassifying the in-transit state into the stationary, fidget, or walk state.

Figure 5:
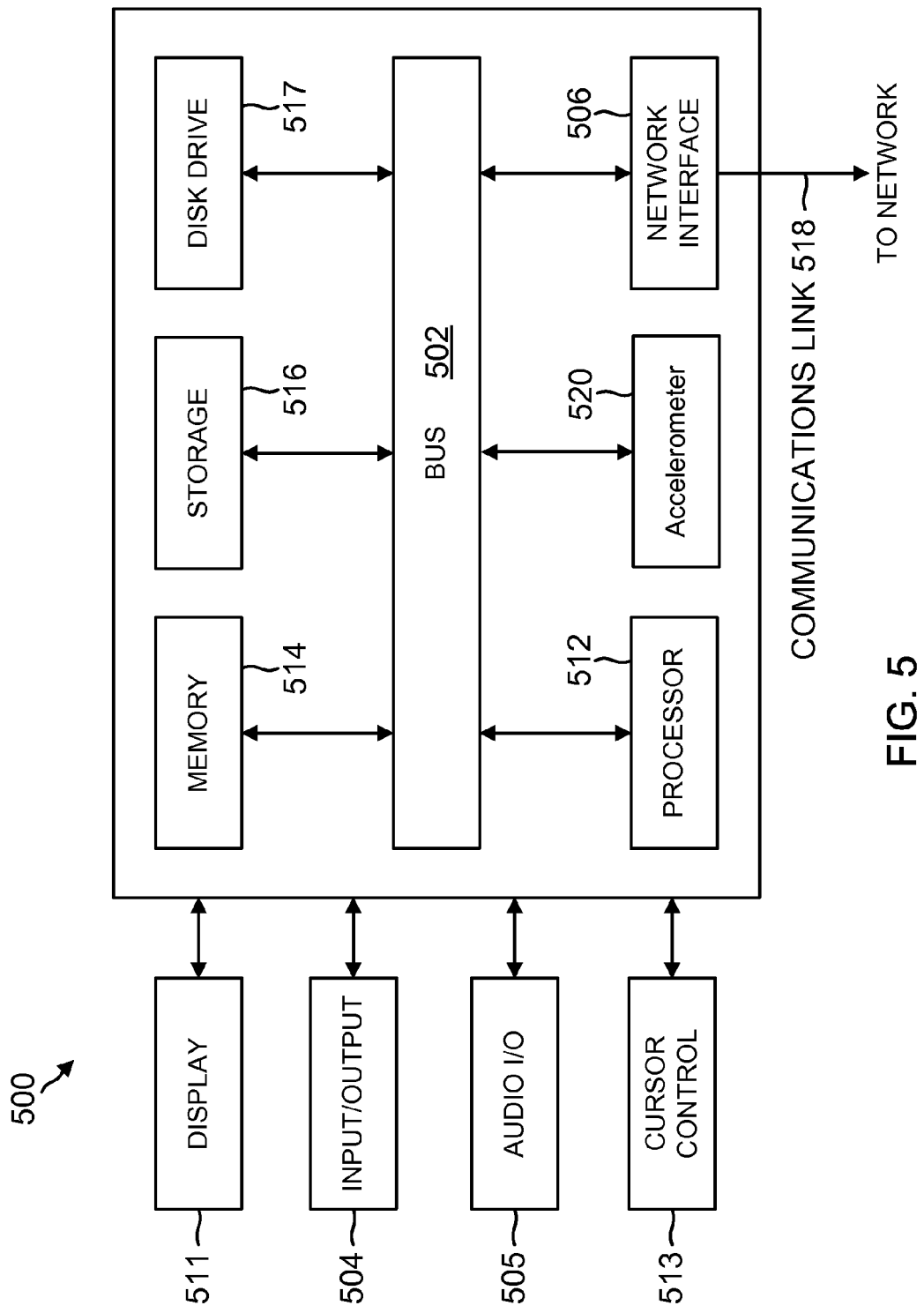
FIG. 5 is a block diagram of a computer system suitable for implementing one or more components discussed herein according to one embodiment of the subject matter of the present disclosure.

FIG. 5 is a block diagram of a computer system 500 suitable for implementing one or more components discussed herein according to one embodiment of the subject matter of the present disclosure. In various implementations, mobile device may comprise a personal computing device, stand-alone or networked (e.g., smart phone, a computing tablet, a personal computer, laptop, PDA, Bluetooth device, key FOB, badge, etc.). The mobile device may comprise or implement a plurality of hardware components and/or software components that operate to perform various methodologies in accordance with the described embodiments.

Computer system 500 includes a bus 502 or other communication mechanism for communicating information data, signals, and information between various components of computer system 500. Components include an input/output (I/O) component 504 that processes a user action, such as selecting keys from a virtual keypad/keyboard, selecting one or more buttons or links, etc., and sends a corresponding signal to bus 502. I/O component 504 may also include an output component such as a display medium 511 mounted a short distance in front of the user's eyes, and an input control such as a cursor control 513 (such as a virtual keyboard, virtual keypad, virtual mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices, such as another user device, or another network computing device via a communication link 518 to a network. In one embodiment, the transmission is wireless, although other transmission mediums and methods may also be suitable. For example, communication link 518 may be a Bluetooth, WiFi channel. Network interface 506 may generate phone state information such as WiFi or Bluetooth connectivity information for use by processor 512 as heuristics for motion state classification. A processor 512, which can be a micro-controller, digital signal processor (DSP), or other processing component, processes these various signals, such as for display on computer system 500 or transmission to other devices via communication link 518. Processor 512 may also control transmission of information, such as cookies or IP addresses, to other devices. An accelerometer 520 registers the motion of computer system 500 in accelerometer signals that may be read by processor 512 through bus 502. In other embodiments, a gyro or other types of motion sensors may be used to detect the motion of computer system 500.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives; volatile media includes dynamic memory, such as system memory component 514; and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, firmware, or combinations thereof. Also where applicable, the various hardware components, software components, and/or firmware components set forth herein may be combined into composite components comprising software, firmware, hardware, and/or all without departing from the spirit of the present disclosure. Where applicable, the various hardware components, software components, and/or firmware components set forth herein may be separated into sub-components comprising software, firmware, hardware, or all without departing from the spirit of the present disclosure. In addition, where applicable, it is contemplated that software components may be implemented as hardware components, and vice-versa. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, although phone state information such as WiFi connectivity, phone charging state, and Bluetooth connectivity are used as heuristics in the described embodiments to improve motion state detection, heuristics based on other phone state, condition, HW or SW, may be used. Similarly, signals from sensors other than accelerometers, such as gyros may be used by a motion classification system to detect motion states. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

What is claimed is:

1. A method for detecting a motion state associated with a device, comprising:
   receiving information on WiFi connectivity of the device;
   determining a WiFi connectivity state based on the information on WiFi connectivity, wherein the WiFi connectivity state indicates whether the device is connected to a mobile WiFi access point, connected to a non-mobile WiFi access point, or not connected to a WiFi access point;
   processing the information on WiFi connectivity of the device to set a probability that the device is in a first motion state based on the WiFi connectivity state;

receiving one or more sensor signals from one or more sensor devices, wherein characteristics of the one or more sensor signals reflect motion of the device; and processing by a motion classifier the one or more sensor signals aided by the probability that the device is in the first motion state to generate a final motion state for the device.

2. The method of claim 1, wherein the processing by the motion classifier further comprises biasing the final motion state away from the first motion state based on a low probability that the device is in the first motion state as set by the processing of the information on WiFi connectivity of the device.

3. The method of claim 2, wherein the processing by the motion classifier further comprises, responsive to determining that the probability that the device is in the first motion state is low, eliminating the first motion state from consideration for the final motion state.

4. The method of claim 1, wherein the processing by the motion classifier further comprises biasing the final motion state toward the first motion state based on a high probability that the device is in the first motion state as set by the processing of the information on WiFi connectivity of the device.

5. The method of claim 1, wherein the processing the information on WiFi connectivity of the device further comprises:
setting a low probability that the device is in an in-transit state if the WiFi connectivity state indicates that the device is connected to a non-mobile WiFi access point.

6. The method of claim 1, wherein the processing the information on WiFi connectivity of the device further comprises:
setting a high probability that the device is in an in-transit state if the WiFi connectivity state indicates that the device is connected to a mobile WiFi access point.

7. The method of claim 1, processing information on a plurality of periodic WiFi scans performed by the device if the WiFi connectivity state indicates that the device is not connected to a WiFi access point.

8. The method of claim 7, further comprising:
determining if there is a common access point in the plurality of periodic WiFi scans; and
setting a low probability that the device is in an in-transit state if there is a common access point in the plurality of periodic WiFi scans.

9. The method of claim 7, wherein the processing the information on WiFi connectivity of the device further comprises:
responsive to an indication that there is no common access point in the plurality of periodic WiFi scans, setting a high probability that the device is in an in-transit state.

10. A method for detecting a motion state associated with a device, comprising:
receiving one or more sensor signals from one or more sensor devices, wherein characteristics of the one or more sensor signals reflect motion of the device;
processing by one or more tuned modules the one or more sensor signals to generate one or more tuned signals, wherein each of the tuned modules is configured to detect a tuned state of the device, and wherein each of the tuned signals indicates a probability of the tuned state, at least one of the one or more tuned signals indicating whether the device is stationary or in motion; and if the one or more tuned signals indicate that the device is in motion, determining a final motion state of the device based on one or more operating states of the device, the one or more operating states including one or more of:
a charging state of the device; and
a network connectivity of the device.

11. The method of claim 10, wherein one of the tuned modules comprises a pedometer module configured to detect steps.

12. The method of claim 10, wherein the determining of the final motion state of the device further comprises using the probability of the tuned state indicated by one of the tuned signals to drive the final motion state toward the tuned state.

13. The method of claim 10, wherein the determining of the final motion state of the device further comprises bypassing processing by a motion classifier when the probability of the tuned state indicated by one of the tuned signals expresses a high probability of the tuned state.

14. The method of claim 13, wherein when the probability of a stationary state indicated by the tuned signal from one of the tuned modules configured to detect the stationary state exceeds a threshold, the processing by the motion classifier is bypassed, and the final motion state is the stationary state.

15. The method of claim 13, wherein when the probability of a walk state indicated by the tuned signal from one of the tuned modules configured to detect steps exceeds a threshold, the processing by the motion classifier is bypassed, and the final motion state is the walk state.

16. The method of claim 10, wherein the processing by the motion classifier further comprises processing information of the operating state of the device to drive the most likely motion state.

17. The method of claim 16, wherein the processing by the motion classifier further comprises using the information of the operating state of the device to change the probability of one of the one or more tuned states.

18. The method of claim 10, wherein, responsive to a first indication that the device is in a charging state and a second indication that the device is in motion, setting a high probability that the device is in an in-transit state.

19. The method of claim 10, wherein, responsive to a first indication that that the device is connected to a car Bluetooth device or a mobile WiFi access point and a second indication that the device is in motion, setting a high probability that the device is in an in-transit state.

20. The method of claim 10, wherein one of the one or more sensor devices is an accelerometer.

21. An apparatus, comprising:
a sensor configured to register a motion of the apparatus in sensor signals, wherein characteristics of the sensor signals reflect motion of the apparatus;
a memory; and
one or more processors coupled to the memory and configured to:
receive information on WiFi connectivity of the apparatus;
determine a WiFi connectivity state based on the information on WiFi connectivity, wherein the WiFi connectivity state indicates whether the device is connected to a mobile WiFi access point, connected to a non-mobile WiFi access point, or not connected to a WiFi access point;

process the information on WiFi connectivity of the apparatus to set a probability that the apparatus is in a first motion state based on the WiFi connectivity state; and process the sensor signals aided by the probability that the apparatus is in the first motion state to generate a final motion state for the apparatus.

22. The apparatus of claim 21, wherein the one or more processors are configured to process the sensor signals by being further configured to bias the final motion state away from the first motion state based on a low probability that the apparatus is in the first motion state as processed from the information on WiFi connectivity of the apparatus.

23. The apparatus of claim 22, wherein the one or more processors are configured to process the sensor signals by being further configured to eliminate, responsive to a very low probability that the apparatus is in the first motion state, the first motion state from consideration for the final motion state.

24. The apparatus of claim 21, wherein the one or more processors are configured to process the sensor signals by being further configured to bias the final motion state toward the first motion state based on a high probability that the apparatus is in the first motion state as processed from the information on WiFi connectivity of the apparatus.

25. The apparatus of claim 21, wherein the one or more processors are configured to process the information on WiFi connectivity of the apparatus by being further configured to set a low probability that the apparatus is in an in-transit state if the WiFi connectivity state indicates that the device is connected to a non-mobile WiFi access point.

26. The apparatus of claim 21, wherein the one or more processors are configured to process the information on WiFi connectivity of the apparatus by being further configured to set a high probability that the apparatus is in an in-transit state if the WiFi connectivity state indicates that the device is connected to a mobile WiFi access point.

27. The apparatus of claim 21, wherein the one or more processors are configured to process the information on WiFi connectivity of the apparatus by being further configured to process information on a plurality of periodic WiFi scans performed by the apparatus if the WiFi connectivity state indicates that the device is not connected to a WiFi access point.

28. The apparatus of claim 27, wherein the one or more processors are configured to process the information on WiFi connectivity of the apparatus by being further configured to:

determining if there is a common access point in the plurality of periodic WiFi scans; and set a low probability that the apparatus is in an in-transit state if there is a common access point in the plurality of periodic WiFi scans.

29. The apparatus of claim 27, wherein the one or more processors are configured to process the information on WiFi connectivity of the apparatus by being further configured to set, responsive to an indication that there is no common Access Point in the plurality of periodic WiFi scans, a high probability that the apparatus is in an in-transit state.

30. An apparatus, comprising:

a sensor configured to register a motion of the apparatus in sensor signals, wherein characteristics of the sensor signals reflect the motion of the apparatus;

a non-transitory memory; and one or more processors coupled to the non-transitory memory and configured to:

process the sensor signals to generate one or more tuned signals, wherein the one or more processors are further configured to detect one or more tuned states of the apparatus, and wherein each of the tuned signals indicates a probability of one of the tuned states, at least one of the one or more tuned signals indicating whether the device is stationary or in motion; and if the one or more tuned signals indicate that the device is in motion, determining a final motion state of the apparatus based on one or more operating states of the device, the one or more operating states including one or more of:

a charging state of the device; and a network connectivity of the device.

31. The apparatus of claim 30, wherein one of the tuned states comprises a stationary state.

32. The apparatus of claim 30, wherein one of the tuned states comprises a walk state.

33. The apparatus of claim 30, wherein the one or more processors are configured to determine the final motion state of the apparatus by being further configured to use the probability of the tuned state indicated by one of the tuned signals to drive the final motion state toward the tuned state.

34. The apparatus of claim 30, wherein the one or more processors are further configured to bypass processing of the sensor signals to generate a most likely motion state when the probability of the tuned state indicated by one of the tuned signals expresses a high probability of the tuned state.

35. The apparatus of claim 34, wherein when the probability of a stationary state indicated by one of the tuned signals for the stationary state exceeds a threshold, the one or more processors are further configured to bypass processing of the sensor signals to generate a most likely motion state, and the final motion state is the stationary state.

36. The apparatus of claim 34, wherein when the probability of a walk state indicated by one of the tuned signals for the walk state exceeds a threshold, the one or more processors are further configured to bypass the process the sensor signals to generate a most likely motion state, and the final motion state is the walk state.

37. The apparatus of claim 30, wherein the one or more processors are further configured to process information of the operating state of the apparatus to drive the most likely motion state.

38. The apparatus of claim 37, wherein the one or more processors are configured to process the sensor signals to generate a most likely motion state by being further configured to use the information of the one or more operating states of the apparatus to change the probability of one of the tuned states.

39. The apparatus of claim 30, wherein the one or more processors are configured to process the sensor signals to generate a most likely motion state by being further configured to generate, responsive to a first indication that the apparatus is in a charging state and a second indication that the apparatus is in motion, setting a high probability that the apparatus is in an in-transit state.

40. The apparatus of claim 30, wherein the one or more processors are configured to process the sensor signals to generate a most likely motion state by being further configured to generate, responsive to a first indication that the apparatus is connected to a car Bluetooth device or a mobile WiFi access point and a second indication that there is motion, setting a high probability that the device, is in an in-transit state.

41. The apparatus of claim 30, wherein the sensor is an accelerometer.

42. A non-transitory machine-readable medium storing a plurality of machine-readable instructions which, when executed by one or more processors, are adapted to cause the one or more processors to:
receive information on WiFi connectivity of a device;
determine a WiFi connectivity state based on the information on WiFi connectivity, wherein the WiFi connectivity state indicates whether the device is connected to a mobile WiFi access point, connected to a non-mobile WiFi access point, or not connected to a WiFi access point;
process the information on WiFi connectivity of the device to set a probability that the device is in a first motion state based on the WiFi connectivity state;
receive one or more sensor signals from one or more sensor devices, wherein characteristics of the one or more sensor signals reflect motion of the device; and
process the one or more sensor signals aided by the probability that the device is in the first motion state to generate a final motion state for the device.

43. The non-transitory machine-readable medium of claim 42, wherein the plurality of machine-readable instructions are further configured to cause the one or more processors to bias the final motion state away from the first motion state based on a low probability that the device is in the first motion state as set by processing of the information on WiFi connectivity of the device.

44. The non-transitory machine-readable medium of claim 43, wherein the processing the one or more sensor signals further comprises eliminating, responsive to a very low probability that the device is in the first motion state, the first motion state from consideration.

45. The non-transitory machine-readable medium of claim 42, wherein the plurality of machine-readable instructions are further configured to cause the one or more processors to bias the final motion state toward the first motion state based on a high probability that the device is in the first motion state as set by processing of the information on WiFi connectivity of the device.

46. The non-transitory machine-readable medium of claim 42, wherein the plurality of machine-readable instructions are further configured to cause the one or more processors to:
set a low probability that the device is in an in-transit state if the WiFi connectivity state indicates that the device is connected to a non-mobile WiFi access point.

47. The non-transitory machine-readable medium of claim 42, wherein the plurality of machine-readable instructions are further configured to cause the one or more processors to:
set a high probability that the device is in an in-transit state if the WiFi connectivity state indicates that the device is connected to a mobile WiFi access point.

48. The non-transitory machine-readable medium of claim 42, wherein the plurality of machine-readable instructions are further configured to cause the one or more processors to process information on a plurality of periodic WiFi scans performed by the device if the WiFi connectivity state indicates that the device is not connected to a WiFi access point.

49. The non-transitory machine-readable medium of claim 48, wherein the plurality of machine-readable instructions are further configured to cause the one or more processors to:
determining if there is a common access point in the plurality of periodic WiFi scans; and
set a low probability that the device is in an in-transit state if there is a common access point in the plurality of periodic WiFi scans.

50. The non-transitory machine-readable medium of claim 48, wherein the plurality of machine-readable instructions are further configured to cause the one or more processors to:
set, responsive to an indication that there is no common access point in the plurality of periodic WiFi scans, a high probability that the device is in an in-transit state.

51. A non-transitory machine-readable medium storing a plurality of machine-readable instructions which, when executed by one or more processors, are adapted to cause the one or more processors to:
receive one or more sensor signals, wherein characteristics of the one or more sensor signals reflect motion of a device;
process the one or more sensor signals to generate one or more tuned signals, wherein the processing is configured to detect one or more tuned states of the device, and wherein each of the tuned signals indicates a probability of the one or more tuned states, at least one of the one or more tuned signals indicating whether the device is stationary or in motion; and
if the one or more tuned signals indicate that the device is in motion, determine a final motion state of the apparatus based on one or more operating states of the device, the one or more operating states including one or more of:
a charging state of the device; and
a network connectivity of the device.

52. The non-transitory machine-readable medium of claim 51, wherein one of the one or more tuned states comprises a stationary state of the device.

53. The non-transitory machine-readable medium of claim 51, wherein one of the one or more tuned states comprises a walk state of the device.

54. The non-transitory machine-readable medium of claim 51, wherein the plurality of machine-readable instructions are further configured to cause the one or more processors to use the probability of the tuned state indicated by one of the tuned signals to drive the final motion state toward the tuned state to combine the one or more tuned signals.

55. The non-transitory machine-readable medium of claim 51, wherein the plurality of machine-readable instructions are further configured to cause the one or more processors to bypass the processing of the one or more sensor signals to generate a most likely motion state when the probability of the tuned state indicated by one of the tuned signals expresses a high probability of the tuned state.

56. The non-transitory machine-readable medium of claim 55, wherein the plurality of machine-readable instructions are further configured to cause the one or more processors to, responsive to the probability of a stationary state indicated by one of the tuned signals for the stationary state exceeding a threshold, bypass the processing of the one or more sensor signals to generate a most likely motion state and set the final motion state as the stationary state.

57. The non-transitory machine-readable medium of claim 55, wherein the plurality of machine-readable instructions are further configured to cause the one or more processors to, responsive to the probability of a walk state indicated by one of the tuned signals for the walk state exceeding a threshold, bypass the processing the one or more sensor signals to generate a most likely motion state and set the final motion state as the walk state.

58. The non-transitory machine-readable medium of claim 51, wherein the plurality of machine-readable instructions are further configured to cause the one or more processors to process information of the one or more operating states of the device to drive the most likely motion state.

59. The non-transitory machine-readable medium of claim 58, wherein the plurality of machine-readable instructions are further configured to cause the one or more processors to use the information of the operating state of the device to change the probability of one of the one or more tuned states to generate the most likely motion state.

60. The non-transitory machine-readable medium of claim 51, wherein the plurality of machine-readable instructions are further configured to cause the one or more processors to, responsive to a first indication that the device is in a charging state and a second indication based on one of the tuned signals that there is motion, set a high probability that the device is in an in-transit state.

61. The non-transitory machine-readable medium of claim 51, wherein the plurality of machine-readable instructions are further configured to cause the one or more processors to, responsive to a first indication that the device is connected to a car Bluetooth device or a mobile WiFi access point and a second indication that there is motion, set a high probability that the device is in an in-transit state.

62. The non-transitory machine-readable medium of claim 51, wherein one of the one or more sensor signals is received from an accelerometer.

63. A system, comprising:
means for generating information on WiFi connectivity of the system;
means for determining a WiFi connectivity state based on the information on WiFi connectivity, wherein the WiFi connectivity state indicates whether the device is connected to a mobile WiFi access point, connected to a non-mobile WiFi access point, or not connected to a WiFi access point;
means for processing the information on WiFi connectivity of the system to set a probability that the system is in a first motion state based on the WiFi connectivity state;
means for registering a motion of the system in sensor signals, wherein characteristics of the sensor signals reflect motion of the system; and
means for processing the sensor signals aided by the probability that the system is in the first motion state to generate a final motion state for the system.

64. The system of claim 63, wherein the means for processing the sensor signals further comprises means for biasing the final motion state away from the first motion state based on a low probability that the system is in the first motion state as set by the means for processing the information on WiFi connectivity of the system.

65. The system of claim 63, wherein the means for processing the sensor signals further comprises means for eliminating, responsive to a very low probability that the system is in a first motion state, the first motion state from consideration for the final motion state.

66. The system of claim 63, wherein the means for processing the sensor signals further comprises means for biasing the final motion state toward the first motion state based on a high probability that the system is in the first motion state as set by the means for processing the information on WiFi connectivity of the system.

67. The system of claim 63, wherein the means for processing the information on WiFi connectivity of the system further comprises means for setting a low probability that the system is in an in-transit state if the WiFi connectivity state indicates that the device is connected to a non-mobile WiFi access point.

68. The system of claim 63, wherein the means for processing the information on WiFi connectivity of the system further comprises means for setting a high probability that the system is in an in-transit state if the WiFi connectivity state indicates that the device is connected to a mobile WiFi access point.

69. The system of claim 63, wherein the means for generating the information on WiFi connectivity of the system comprises means for performing a plurality of periodic WiFi scans, and wherein the means for processing the information on WiFi connectivity of the system further comprises means for processing information on the plurality of periodic WiFi scans if the WiFi connectivity state indicates that the device is not connected to a WiFi access point.

70. The system of claim 69, wherein the means for processing the information on WiFi connectivity of the system further comprises:
means for determining if there is a common access point in the plurality of periodic WiFi scans; and
means for setting a low probability that the system is in an in-transit state if there is a common access point in the plurality of periodic WiFi scans.

71. The system of claim 69, wherein the means for processing the information on WiFi connectivity of the system further comprises means for setting, responsive to an indication that there is no common access point in the plurality of periodic WiFi scans, a high probability that the system is in an in-transit state.

72. A system, comprising:
means for registering a motion of the system in sensor signals, wherein characteristics of the sensor signals reflect the motion of the system;
means for processing the sensor signals to generate one or more tuned signals, wherein the means for processing the sensor signals further comprises means for detecting one or more tuned states of the system, and wherein each of the tuned signals indicates a probability of one of the one or more tuned states, at least one of the one or more tuned signals indicating whether the device is stationary or in motion; and
means for determining, if the one or more tuned signals indicate that the device is in motion, a final motion state of the device based on one or more operating states of the device, the one or more operating states including one or more of:
a charging state of the device; and
a network connectivity of the device.

73. The system of claim 72, wherein one of the one or more tuned states comprises a stationary state.

74. The system of claim 72, wherein one of the one or more tuned states comprises a walk state.

75. The system of claim 72, wherein the means for determining comprises means for using the probability of the tuned state indicated by one of the tuned signals to drive the final motion state toward the tuned state.

76. The system of claim 72, wherein the system further comprises means for bypassing processing of the sensor signals to generate a most likely motion state when the probability of the tuned state indicated by one of the tuned signals expresses a high probability of the tuned state.

77. The system of claim 76, wherein when the probability of a stationary state indicated by one of the tuned signals for the stationary state exceeds a threshold, means for processing the sensor signals to generate a most likely motion state is bypassed, and the means for determining is configured to determine the final motion state is the stationary state.

78. The system of claim 76, wherein when the probability of a walk state indicated by one of the tuned signals for the walk state exceeds a threshold, means for processing the sensor signals to generate a most likely motion state is bypassed, and the means for determining is configured to determine the final motion state is the walk state.

79. The system of claim 72, further comprising means for processing information of the one or more operating states of the system to drive the most likely motion state.

80. The system of claim 79, wherein the means for processing the sensor signals to generate a most likely motion state further comprises means for using the information of the one or more operating states of the system to change the probability of one of the one or more tuned states.

81. The system of claim 72, wherein the means for processing the sensor signals to generate a most likely motion state further comprises means for setting, responsive to a first indication that the system is in a charging state and a second indication that the system is in motion, a high probability that the system is in an in-transit state.

82. The system of claim 72, wherein the means for processing the sensor signals to generate a most likely motion state further comprises means for setting, responsive to a first indication that the system is connected to a car Bluetooth device or a mobile WiFi access point and a second indication that the device is in motion, a high probability that the system is in an in-transit state.

83. The system of claim 72, wherein the means for registering a motion of the system is an accelerometer.

* * * * *